No. 788,589. PATENTED MAY 2, 1905.
G. MITCHELL.
COPPER SMELTING AND SEPARATING.
APPLICATION FILED FEB. 29, 1904.

WITNESSES
G. F. Downing.
R. S. Ferguson.

INVENTOR
George Mitchell
By H. G. Seymour
Attorney

UNITED STATES PATENT OFFICE.

GEORGE MITCHELL, OF LOS ANGELES, CALIFORNIA.

COPPER SMELTING AND SEPARATING.

SPECIFICATION forming part of Letters Patent No. 788,589, dated May 2, 1905.

Application filed February 29, 1904. Serial No. 195,928.

*To all whom it may concern:*

Be it known that I, GEORGE MITCHELL, of Los Angeles, in the county of Los Angeles and State of California, have invented certain new and useful Improvements in Copper Smelting and Separating; and I do hereby declare the following to be a full, clear, and exact description of the invention, such as will enable others skilled in the art to which it appertains to make and use the same.

My invention relates to improvements in the the art of copper smelting and separating, the object of the invention being to provide a process of reducing and separating copper from its ore, which shall result in economy of fuel.

With this object in view the invention consists in certain novel steps in the reduction and separation of copper, as hereinafter set forth, and pointed out in the claims.

Figure 1:
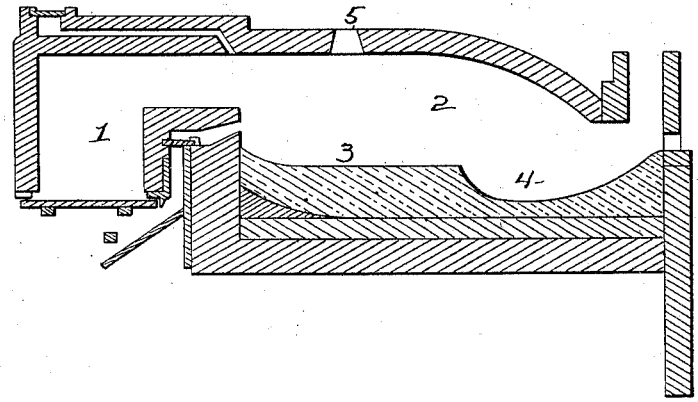
Figure 2:
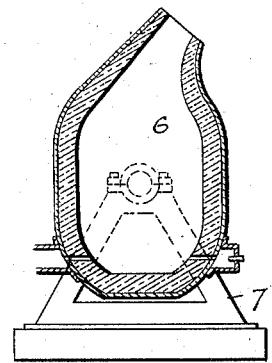

In the accompanying drawings, Figure 1 represents a smelting-furnace, and Fig. 2 a converter, with the use of which my improved process may be carried into effect.

1 represents a furnace of the reverberatory variety having a furnace-chamber 1, a smelting-chamber 2, having a hearth 3 and a well 4, and provided in its top with a charging-hole 5.

A converter is represented at 6 and mounted to rock in a frame 7.

The particular constructions of the furnace and converter shown are not essential to the carrying out of my improved process, as various other constructions well known in the art might be employed, if desired.

In carrying out my improved process I feed into a suitable smelting-furnace any kind of copper sulfid, pyrites, or silicious ores in particular, after having finely crushed the same and without roasting. The ore can be fed into the furnace continuously or otherwise, as may be found desirable, according to the condition and character of the ore to be smelted, in order to obtain the best results. I then subject the crushed ore, without the admixture therewith of any carbonaceous or other fuel not already contained in the ore, to a sufficient degree of heat in a reducing atmosphere within the smelting-furnace to effect fusing, admitting only sufficient air to support combustion and avoiding the presence of sufficient oxygen to cause a chemical union of the metallic portion with silica. In this manner the crushed ore will be so smelted as to fuse the metal without forming silicates—that is to say, the metallic portion of the ore will be fused, leaving the silica (when silicious ores are being smelted) behind and unattacked by the metallic portion, the amount of oxygen in the furnace during the smelting operation being kept at a minimum by reason of the fact that the ore has not been oxidized by roasting and by reason of the introduction of a limited amount of air into the furnace. Thus the expensive operation of roasting is avoided. Furthermore, I am enabled to save the enormous amount of fuel consumed in present smelting processes of separating metals from silica by forming silicates of them, as occurs in the smelting of roasted ores. It may sometimes be found desirable, in order to further economize fuel, to change the atmosphere of the furnace from time to time by the admission of a small amount of air, which would cause a slight oxidizing action, and heat would be thereby obtained by oxidation of the sulfur and the metals and the breaking up of some of the chemical constituents of some ores. The fused matte, minus the silica or silicious matter, (when silicious ores are being smelted,) will be driven or drawn off from time to time or in a continuous stream, according to the amount of ore smelted. The matte thus drawn off in a molten condition will be charged into a Bessemer converter, which can be lined with a basic or an acid lining, as may be best suited as conditions would demand in certain localities.

The hot silica that is left behind in the smelting-furnace and from which the metal has been separated, as above explained, will be removed from time to time and fed into the converter to obtain the benefit of lengthening the life of the lining of the converter and also to assist in giving silica more readily and rapidly to the oxids that are being formed in the converter, which results are most efficaciously and thoroughly accomplished because of the hot and chemically-unchanged condition of the silica as it comes from the smelting-furnace, the oxids being changed into silicates in the converter rather than in the smelting-furnace.

It is apparent that by fusing only the metals in the ores in the smelting-furnace, avoiding the formation of silicates, there will result a very great saving of the fuel which has heretofore been necessary to separate metals from the silica when during the smelting operation a chemical union of the metals with the silica has been permitted. By my process a further saving of fuel is accomplished and the lining of the converter is most effectually preserved by transferring the hot silica directly from the smelting-furnace to the converter.

Having fully described my invention, what I claim as new, and desire to secure by Letters Patent, is—

1. The process of separating silicious ore, which consists in subjecting the raw ore to a reducing atmosphere in a smelting-furnace, fusing it therein, avoiding the chemical union of the metal with silica in the smelting-furnace, and withdrawing the molten matte.

2. The process of separating silicious copper ore, which consists in fusing the metal in a smelting-furnace; avoiding the union of the metal with silica, withdrawing the fused matte in molten condition and separately withdrawing the silica.

3. The process of separating silicious ore, which consists in fusing the metal and separating it from the silica; avoiding the union of the metal with the silica, withdrawing the molten matte and silica separately, and subsequently utilizing the hot silica in a converter.

4. The process of separating silicious ore, which consists in subjecting the ore to a reducing atmosphere in a smelting-furnace; fusing it therein, avoiding a chemical union of the metal and silica, and then withdrawing the molten matte, leaving the silica behind.

5. The process of separating silicious ore, which consists in crushing raw ore and discharging it into a smelting-furnace; subjecting the ore to a reducing atmosphere within the smelting-furnace; fusing it therein avoiding the union of metal and silica; withdrawing the molten matte; discharging it into a converter then withdrawing the silica and discharging it into the converter.

6. The process of separating copper ore, which consists in subjecting raw ore to a reducing atmosphere in a smelting-furnace, fusing it therein, withdrawing the molten matte from the smelting-furnace, and discharging said metal while hot into a converter.

7. The process of separating silicious copper ore, which consists in subjecting the raw ore to a reducing atmosphere in a smelting-furnace, avoiding the chemical union of the metal with silica in the smelting-furnace, withdrawing the molten matte from the smelting-furnace and discharging it while hot into a converter.

In testimony whereof I have signed this specification in the presence of two subscribing witnesses.

GEORGE MITCHELL.

Witnesses:
   HARRY G. HECHT,
   N. J. MACPHERON.